(12) United States Patent
Chen et al.

(10) Patent No.: US 7,722,136 B2
(45) Date of Patent: May 25, 2010

(54) COMPUTER FRONT BEZEL ASSEMBLY WITH ACCESS DOOR

(75) Inventors: Yun-Lung Chen, Shenzhen (CN); Lin Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 874 days.

(21) Appl. No.: 11/308,949

(22) Filed: May 29, 2006

(65) Prior Publication Data

US 2007/0170825 A1  Jul. 26, 2007

(30) Foreign Application Priority Data

Jan. 24, 2006 (CN) .................. 2006 2 0054762

(51) Int. Cl.
*A47B 97/00* (2006.01)
(52) U.S. Cl. .................. 312/223.2; 361/727
(58) Field of Classification Search .......... 312/223.2, 312/265.6, 223.1, 222, 257.1, 291, 292; 361/6, 361/679.3, 679.4, 679.5, 679.9, 679.58, 679.02, 361/724, 725, 727, 756; 24/591.1, DIG. 44, 24/DIG. 46, DIG. 47, DIG. 49; 403/329, 403/397; 292/80, 81, 83, 87, DIG. 11
See application file for complete search history.

(56) References Cited

U.S. PATENT DOCUMENTS

| | | | | |
|---|---|---|---|---|
| 3,103,378 A * | 9/1963 | Ahlgren | .................. | 292/17 |
| 3,200,464 A * | 8/1965 | Cousins | .................. | 24/593.1 |
| 4,804,238 A * | 2/1989 | Bischof et al. | .......... | 312/138.1 |
| 5,056,846 A * | 10/1991 | Tanaka | .................. | 296/37.1 |
| 5,169,218 A * | 12/1992 | Chu | .................. | 312/223.2 |
| 5,820,235 A * | 10/1998 | Tsai | .................. | 312/223.2 |
| 5,924,780 A * | 7/1999 | Ammon et al. | .......... | 312/223.2 |
| 5,931,514 A * | 8/1999 | Chung | .................. | 292/89 |
| 6,028,767 A * | 2/2000 | Lan | .................. | 361/679.43 |
| 6,049,452 A * | 4/2000 | You et al. | .......... | 361/679.37 |
| 6,132,019 A * | 10/2000 | Kim et al. | .......... | 312/223.2 |
| 6,219,226 B1 * | 4/2001 | Bullington et al. | ..... | 361/679.37 |
| 6,234,593 B1 * | 5/2001 | Chen et al. | .......... | 312/223.2 |
| 6,415,622 B2 * | 7/2002 | Kim et al. | .......... | 62/409 |
| 6,452,788 B1 * | 9/2002 | Crowley | .......... | 361/679.37 |
| 6,834,919 B1 * | 12/2004 | Mariano | .......... | 312/223.2 |
| 2002/0109966 A1 * | 8/2002 | Crowley | .......... | 361/683 |
| 2004/0240166 A1 * | 12/2004 | Kuo | .......... | 361/683 |
| 2005/0276022 A1 * | 12/2005 | Xu | .......... | 361/724 |
| 2005/0286216 A1 * | 12/2005 | Chen et al. | .......... | 361/683 |
| 2006/0086161 A1 * | 4/2006 | Johansson | .......... | 70/208 |
| 2007/0013277 A1 * | 1/2007 | Lin et al. | .......... | 312/223.2 |

\* cited by examiner

*Primary Examiner*—James O Hansen
(74) *Attorney, Agent, or Firm*—Wei Te Chung

(57) ABSTRACT

A computer front bezel assembly includes a panel (10) and an access door (30). The panel defines an opening (12) therein. A securing tab (14) protrudes from the panel. The access door is slidably attached to the panel. The access door includes a shielding board (31) and an extending board (32). The access door moves up to cover the opening. A resilient engaging portion (326) is formed on the extending board for engaging with the securing tab. An expansion slot (321) is defined adjacent to the engaging portion for providing resiliency to the engaging portion. When the sliding board slides on the panel, the securing portion urges the engaging portion to deform for engagement/disengagement.

2 Claims, 7 Drawing Sheets

COMPUTER FRONT BEZEL ASSEMBLY WITH ACCESS DOOR

FIELD OF THE INVENTION

The present invention relates to a computer front bezel assembly, and more particularly to a computer front bezel assembly with an access door thereon for protecting disk drives of the computer from being defaced and/or for ornamental use.

DESCRIPTION OF RELATED ART

Previously, a pivotable access door was usually used on a computer front bezel for shielding computer disk drives, the door swung to one side or the other when the door was opened. However, when the front bezel was located in an area with restricted space, the door often could not be opened or could only be partially opened. Therefore, the door was subject to damage.

A movable access door is disclosed afterwards. A computer mainframe front panel assembly includes a front panel and a lift gate. The front panel includes two parallel rails longitudinally disposed on an inner wall surface thereof at two opposite sides and a transverse rail connected between the two parallel rails at the bottom. Each parallel rail has a plurality of spaced blocks. The lift gate includes a frame secured to the two parallel rails and a cover plate. The cover plate has a plurality of spring pawls alternately and equidistantly spaced from one another on a back wall at two opposite sides. And there is an elongated slot transversely disposed at an upper location to provide a means for grasping. The frame includes two angle rails longitudinally disposed at two opposite sides. And there is a framed wall aligned with the disk drive slot. Each angle rail has a plurality of retaining holes for engaging the blocks on the parallel rails and a plurality of spaced recesses for engaging the spring pawls on the cover plate. However, the spring pawls of the lift gate can easily become defective, so the lift gate cannot be firmly secured in its position shielding the disk drive slot.

What is needed, therefore, is to provide a computer front bezel assembly with an access door, which can conveniently and firmly secure the access door in an open or closed position.

SUMMARY OF INVENTION

A computer front bezel assembly includes a panel and an access door. The panel defines an opening therein. A securing tab protrudes from the panel. The access door is slidably attached to the panel. The access door includes a shielding board and an extending board. The access door moves up to cover the opening. A resilient engaging portion is formed on the extending board for engaging with the securing tab. An expansion slot is defined adjacent to the engaging portion for providing resiliency to the engaging portion. When the sliding board slides on the panel, the securing portion urges the engaging portion to deform for engagement/disengagement.

Other advantages and novel features will be drawn from the following detailed description of a preferred embodiment with attached drawings, in which:

DETAILED DESCRIPTION

Figure 1:
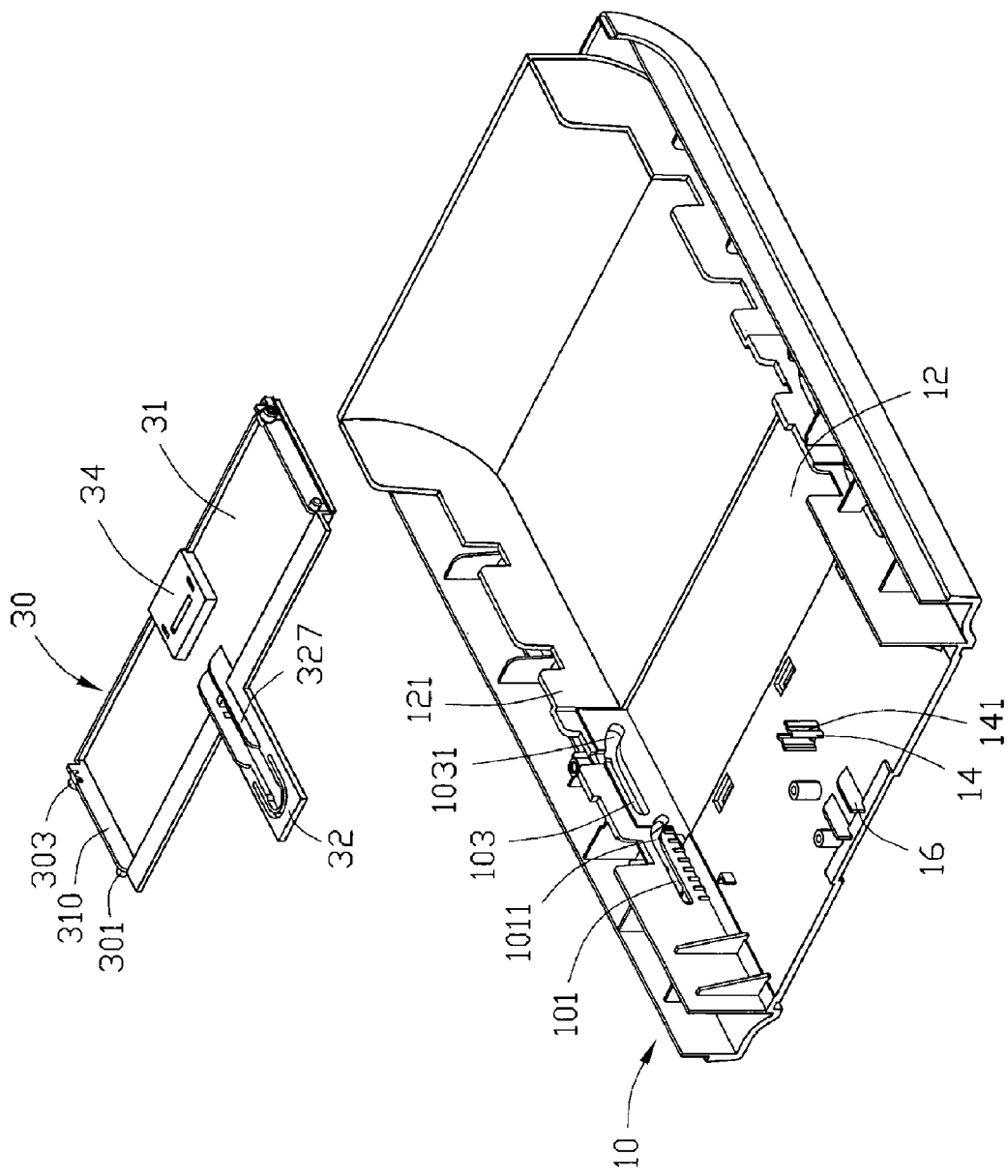
FIG. 1 is an exploded, isometric view of a computer front bezel assembly of a preferred embodiment of the present invention, the assembly including a main panel and an access door.

Referring to FIG. 1, a front bezel assembly with an access door of an electronic device like a computer includes a main panel 10, and an access door 30. The front bezel assembly is installed in front of an enclosure of the computer.

The main panel 30 has an elongated configuration, and defines a quadrate opening 12 therein. A pair of fortified flanges 121 is perpendicularly formed on two opposite edges of the main panel 10 from an inner side thereof. Each fortified flange 121 defines a first sliding slot 101, and a second sliding slot 103. The first sliding slots 101 and the second sliding slots 103 in both fortified flanges 121 are symmetrical. The first sliding slots 101 and the second sliding slots 103 have a first arcuate end 1011 and a second arcuate end 1031 respectively. A pair of securing tabs 14 protrudes in from a bottom portion of the main panel 10 under the access opening 12. The securing tabs 14 have wave-shaped configuration. Each securing tab 14 has a resilient top portion and a securing channel 141 in a middle portion thereof. A pair of parallel supporting clips 16 is formed on a bottom edge of the main panel 10.

Figure 2:
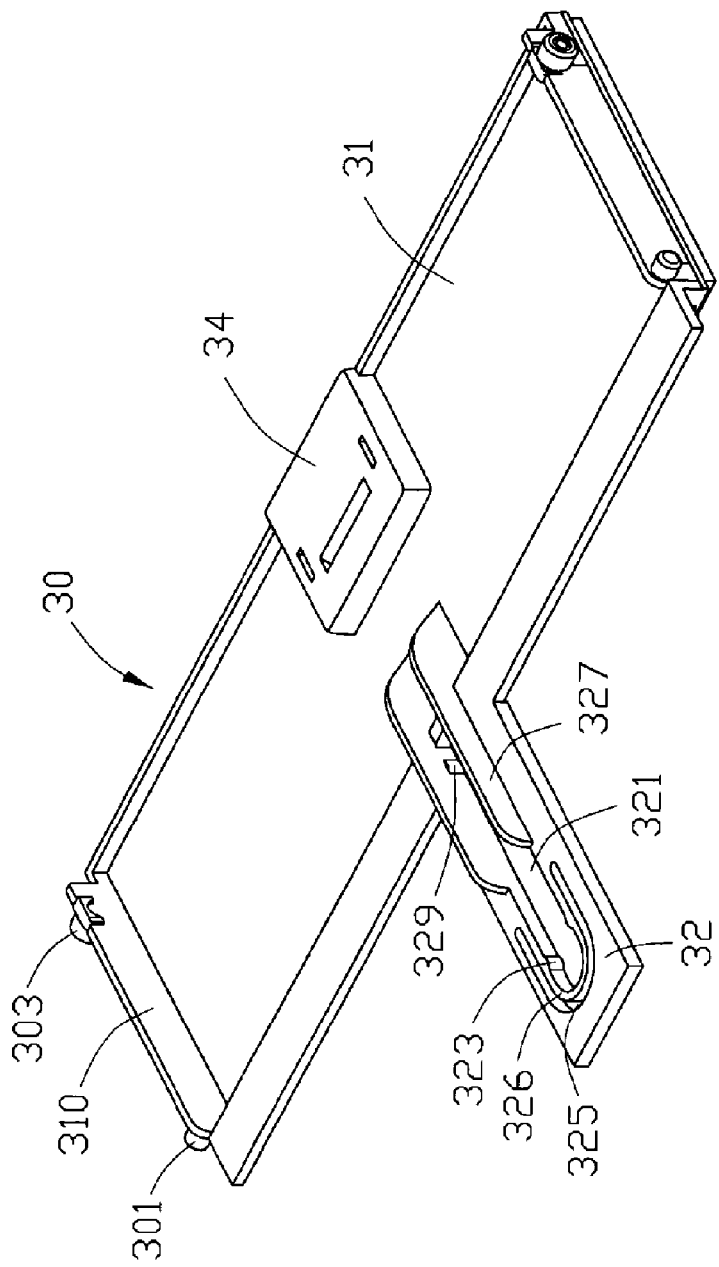
FIG. 2 is an enlarged, isometric view of the access door of FIG. 1.

Referring also to FIG. 2, the access door 30 includes a shielding board 31 and an elongate extending board 32. The extending board 32 is formed perpendicular from a middle portion of an edge of the shielding board 31. A pair of resilient flanges 310 is respectively formed at opposite edges of the shielding board 31. A first holding tab 301 and a second holding tab 303 protrude from each resilient flange 310 corresponding to the first sliding slots 101 and the second sliding slots 103 of the main panel 10 respectively. An operating portion 34 (referring also to FIG. 3) is formed at a top portion of the shielding board 31 opposite to the extending board 32. A recessed portion is correspondingly formed on an outside of the operating portion 34 for manipulating the access door 30. A guiding slot 321 is defined in the extending board 32. A pair of guiding portions 327 is formed up along opposite edges of the guiding slot 321. A pair of protrusions 329 is respectively formed on opposite inner surfaces of the guiding portions 327 corresponding to the securing tabs 14 of the main panel 10. The guiding slot 321 has a round end. The extending board 32 defines a U-shaped expansion slot 325 around the arcuate end of the guiding slot 321 in the extending board 32, thereby forming a resilient engaging portion 326 therebetween. A pair of engaging tabs 323 respectively protrudes from opposite sides of the engaging portion 326.

Figure 3:
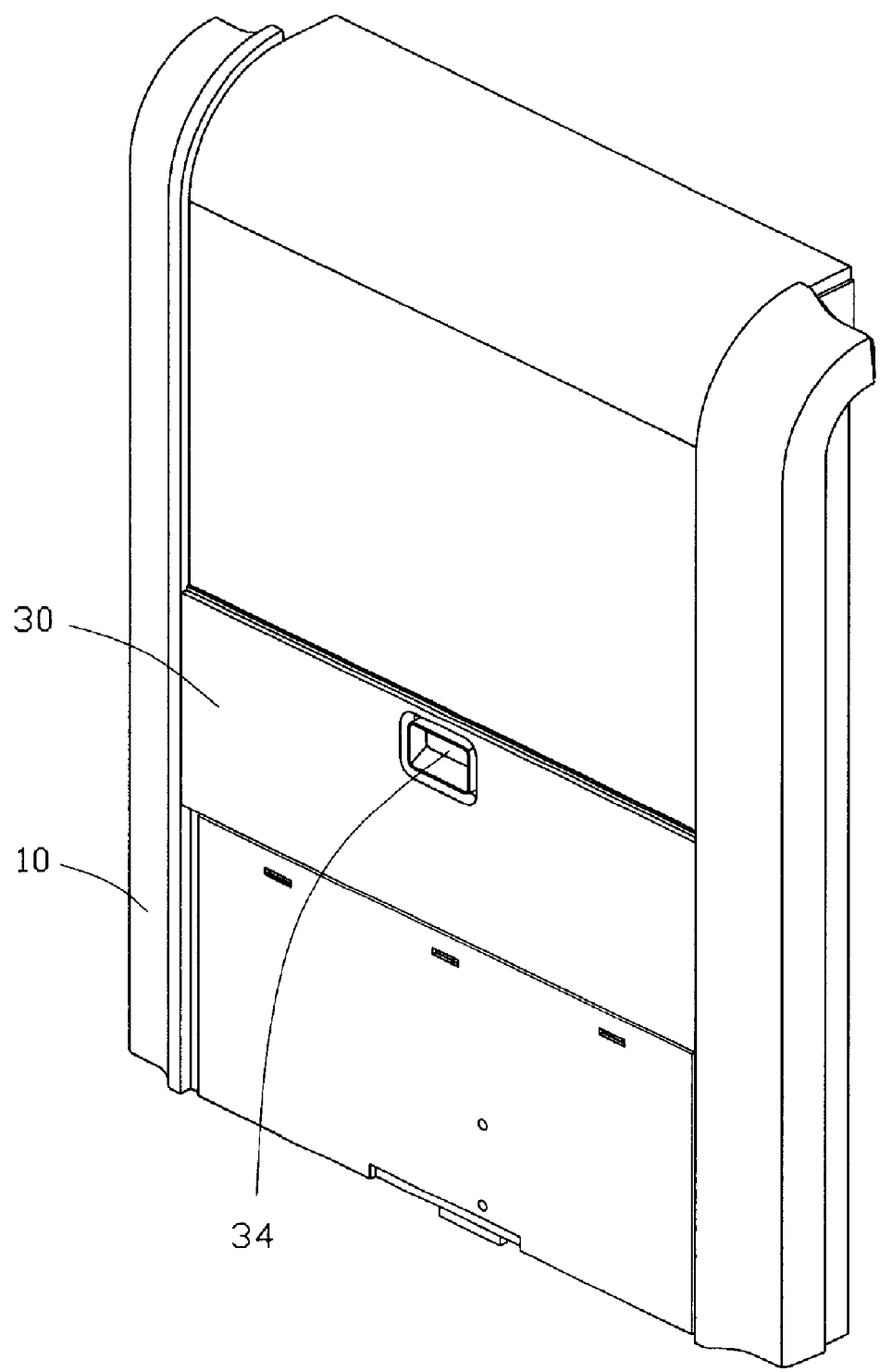
FIG. 3 is an assembled, isometric view of the front bezel assembly of FIG. 1.
Figure 4:
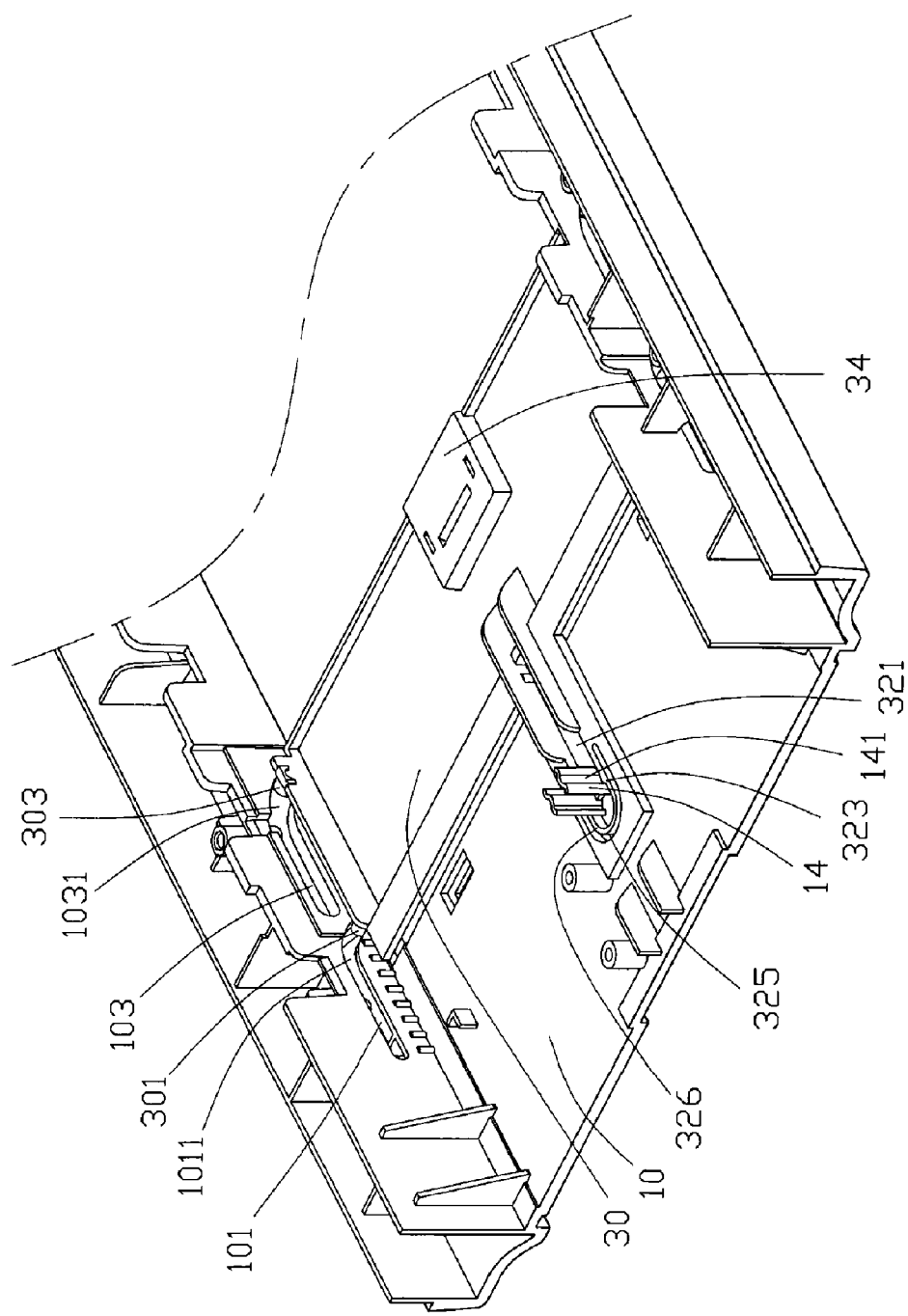
FIG. 4 is a partial, assembled, isometric view of the front bezel assembly of FIG. 1.

Referring also to FIG. 3 and FIG. 4, in assembling the access door 30 to the main panel 10, the first holding tab 301 and the second holding tab 303 on one of the resilient flanges 310 of the shielding board 30 are inserted into the corresponding first sliding slot 101 and the second sliding slot 103. Then the first holding tab 301 and the second holding tab 303 on the other one of the resilient flanges 310 are positioned on the remaining fortified flange 121 of the main panel 10. The access door 30 is further pushed towards the main panel 10, causing the other one of the resilient flanges 310 to be deformed inwardly. Therefore, the first holding tab 301 and the second holding tab 303 on the other one of the resilient flanges 310 slides into the corresponding first sliding slot 101 and the second sliding slot 103 in the remaining fortified flange 121. Simultaneously the securing tabs 14 are received in the guiding slot 321 of the access door 30. Thus the access door 30 is slidably attached to the main panel 10.

When closing the access door 30, the access door 30 is moved upwardly. The access door 30 slides in the first sliding slots 101 and the second sliding slots 103 of the main panel 10. When the access door 30 reaches the first arcuate end 1011 and the second arcuate end 1031, the access door 30 covers the opening 12 of the main panel 10. The engaging portion 326 is urged to expand outwardly by the securing tabs 14, thereby the engaging tabs 323 are received in the securing channels 141 of the securing tabs 14. Thus the access door 30 is in a closed position.

Figure 5:
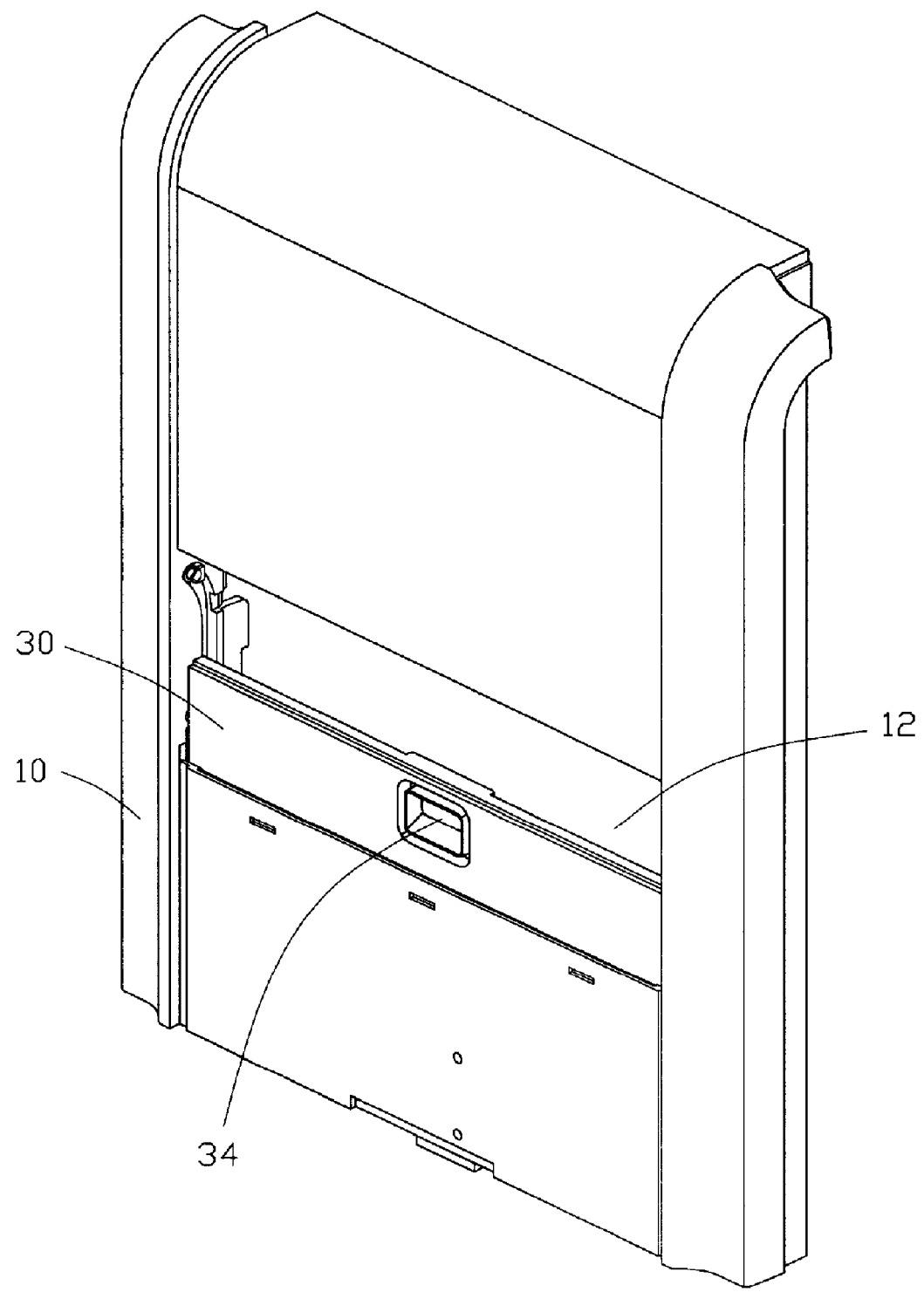
FIG. 5 is similar to FIG. 3, but the access door is slid down.
Figure 6:
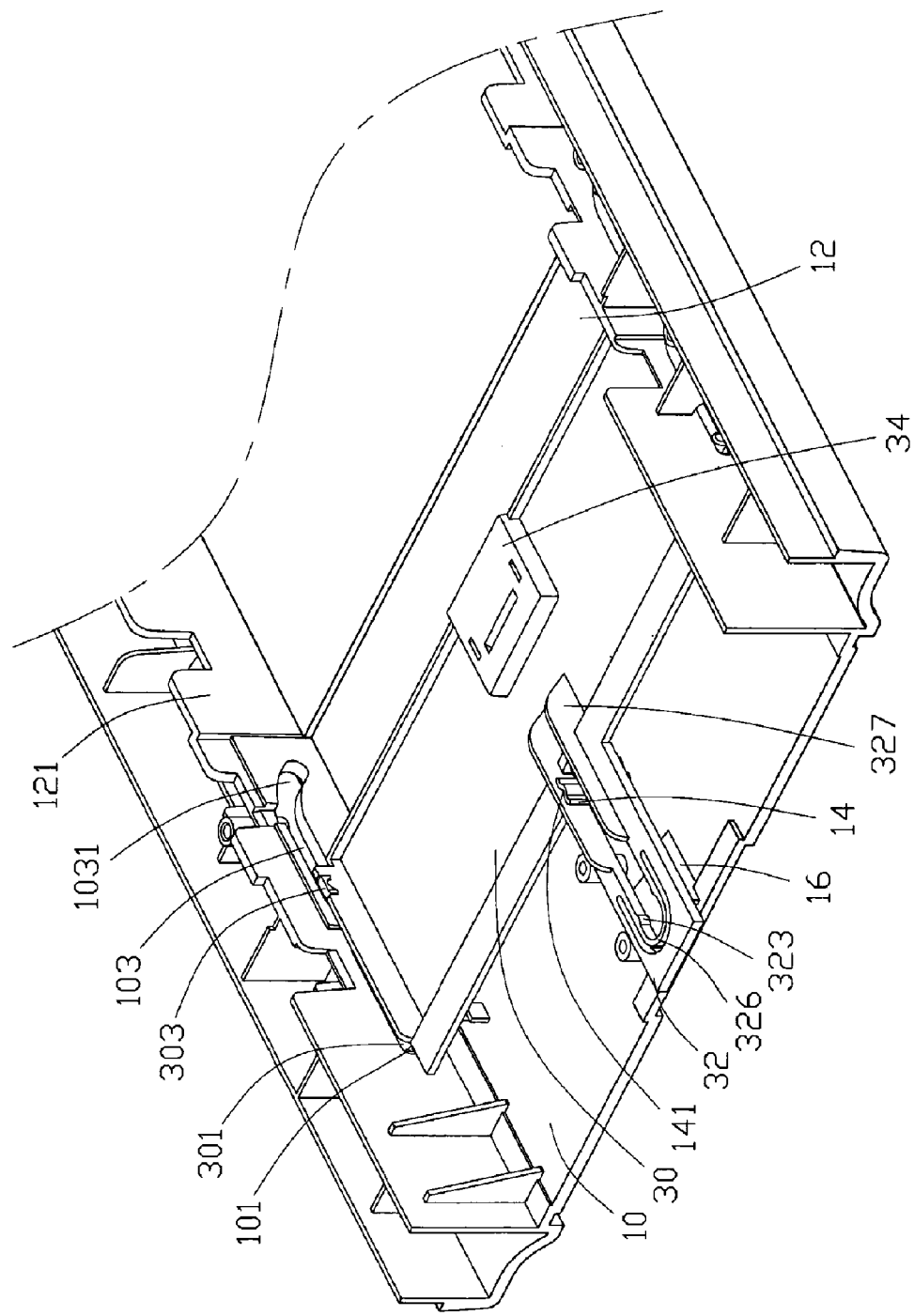
FIG. 6 is similar to FIG. 4, but the access door is slid down.
Figure 7:
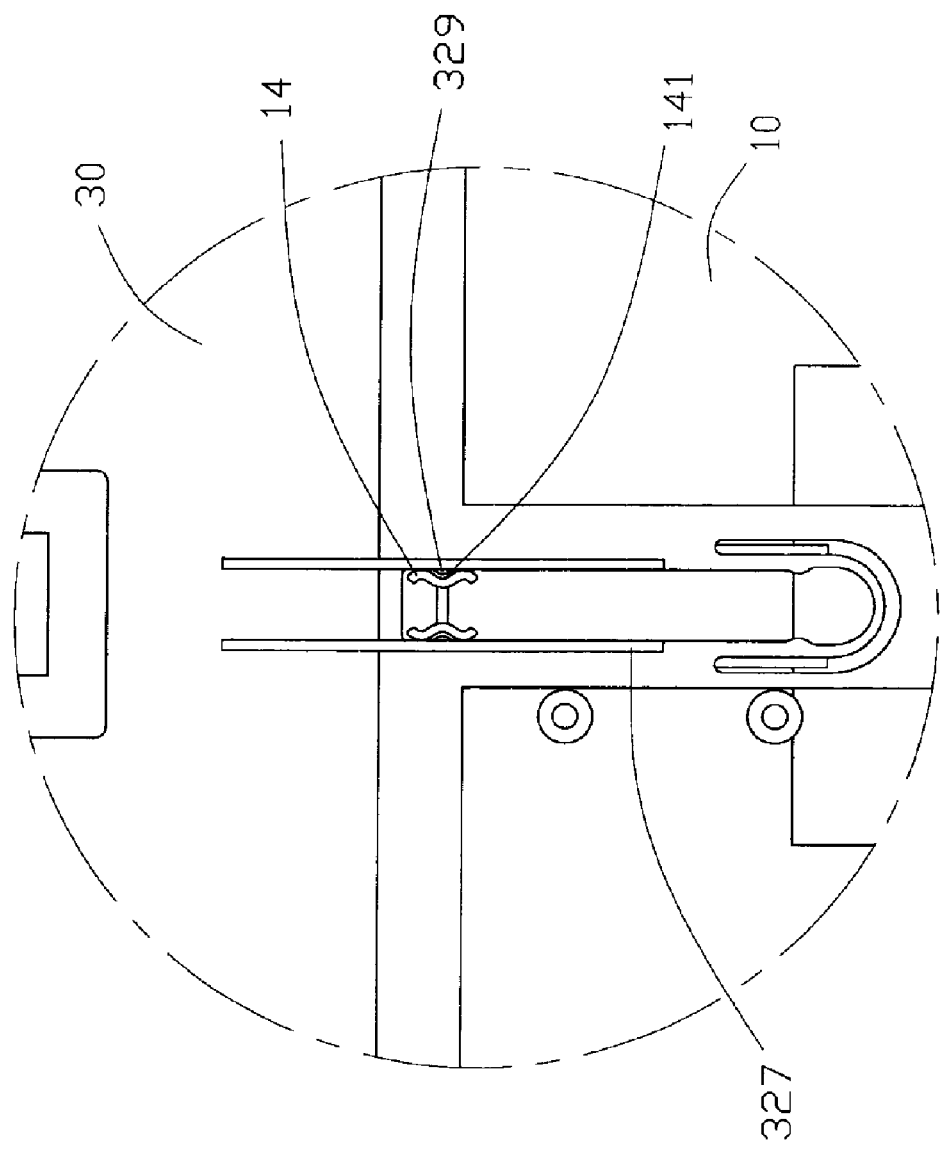
FIG. 7 is a partial, front, enlarged view of the computer front bezel assembly, when the access door is slid down.

Referring also to FIG. 5 to FIG. 7, when opening the access door 30, the shielding board 31 is pushed inwardly and down from a front side of the main panel 10. The engaging tabs 323 of the extending board 32 are disengaged from the securing channel 141 of the securing tabs 14. Therefore the access door 30 slides down and back along the first sliding slots 101 and the second sliding slots 103 of the main panel 10. The extending board 32 of the access door 30 slides onto the supporting clips 16 of the main panel 10. The protrusions 329 are engaged into a top portion of the securing channel 141. Thus, the access door 30 is secured in an open position.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer front bezel assembly, comprising:
   a panel defining an opening therein, a securing tab protruding from the panel; and
   an access door slidably attached to the panel, the access door comprising a shielding board and an extending board, the access door movable up and down for the shielding board to cover the opening, a resilient engaging portion formed on the extending board for engaging with the securing tab, a U-shaped expansion slot defined around the engaging portion for providing resiliency to the engaging portion, wherein when the shielding board slides on the panel, the securing tab urges the engaging portion to deform for engagement/disengagement;
   wherein a guiding slot is defined in the extending board for receiving the securing tab therein, and the engaging portion is formed at an end portion of the guiding slot; the expansion slot is defined around the end portion of the guiding slot; and a protrusion is inwardly formed on the other end of the guiding slot for engaging with the securing tab.

2. A computer front bezel assembly, comprising:
   a panel defining an opening therein, a pair of flanges formed thereon, each flange defining at least one arcuate slot, a securing tab protruding from the panel, the securing tab having a resilient top portion; and
   an access door movably received in the slot and adapted to cover the opening, the access door comprising a shielding board and an extending board, a protrusion formed on an edge of the extending board towards a first direction corresponding to the securing tab, wherein when the shielding board slides downward on the panel along a second direction that is perpendicular to the first direction, the protrusion slides to the top portion of the securing tab and engages therewith;
   wherein a guiding slot is defined in the extending board for receiving the securing tab therein, and the protrusion is formed at a side of the guiding slot; a resilient engaging portion is formed at an end portion of the guiding slot for engaging with the securing tab; an expansion slot is defined adjacent to the engaging portion for providing resiliency to the engaging portion; and the expansion slot is defined around the end portion of the guiding slot.

* * * * *